May 27, 1958 R. A. KOLPEK 2,836,653

TAPE MOVEMENT CHECK IN A TELEGRAPH SYSTEM

Filed Oct. 30, 1953 3 Sheets-Sheet 1

INVENTOR.
ROBERT A. KOLPEK
BY Wm. Walter Owen,
ATTY.

May 27, 1958 R. A. KOLPEK 2,836,653

TAPE MOVEMENT CHECK IN A TELEGRAPH SYSTEM

Filed Oct. 30, 1953 3 Sheets-Sheet 2

INVENTOR.
ROBERT A. KOLPEK
BY Wm. Walter Owen
ATTY.

May 27, 1958 R. A. KOLPEK 2,836,653

TAPE MOVEMENT CHECK IN A TELEGRAPH SYSTEM

Filed Oct. 30, 1953 3 Sheets-Sheet 3

INVENTOR.
ROBERT A. KOLPEK

BY Wm Walter Owen

ATTY.

2,836,653

TAPE MOVEMENT CHECK IN A TELEGRAPH SYSTEM

Robert A. Kolpek, Chicago, Ill., assignor to General Telephone Laboratories, Incorporated, a corporation of Delaware Application October 30, 1953, Serial No. 389,237

7 Claims. (Cl. 178—17)

Figure 1:
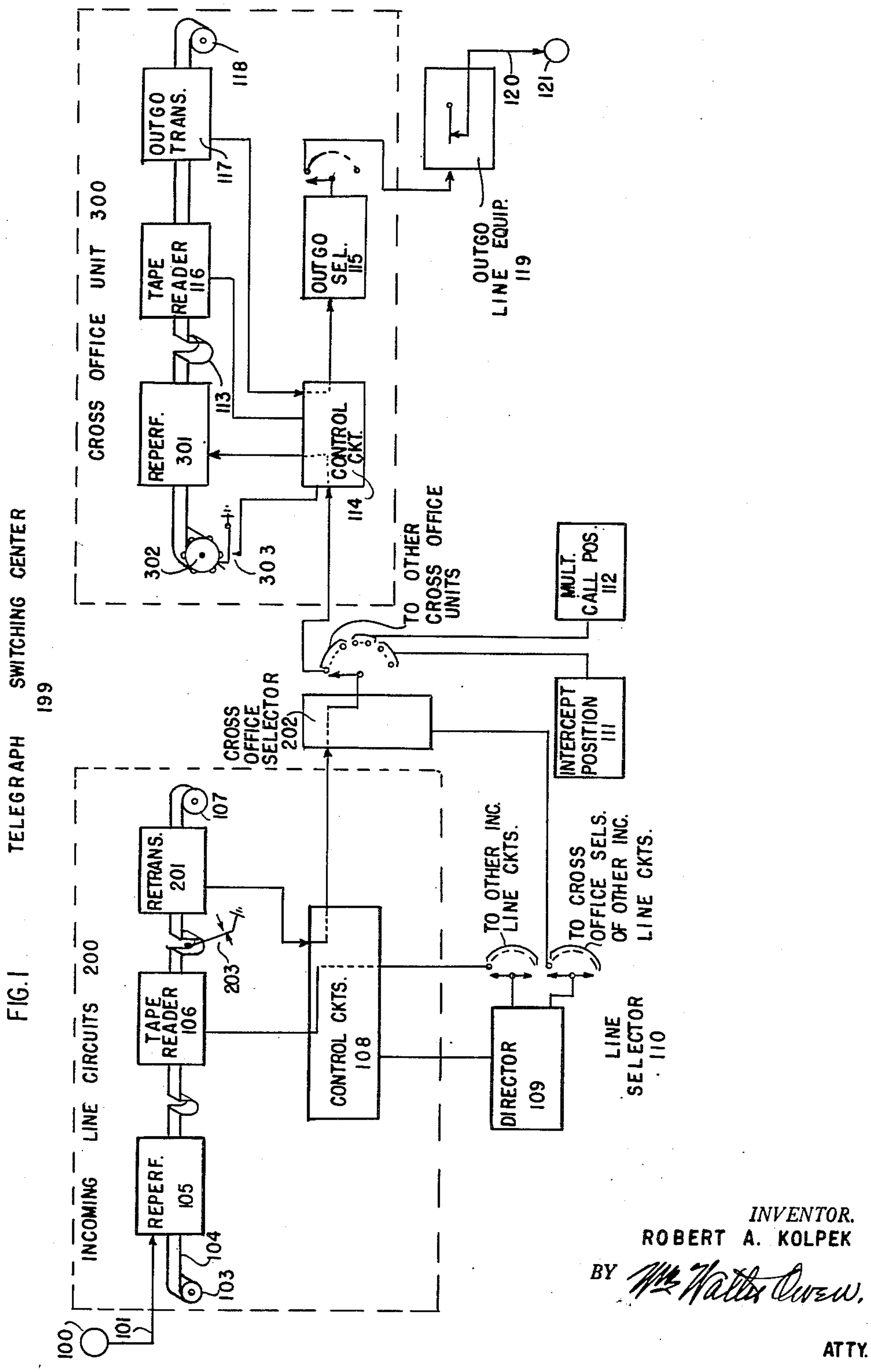

This invention relates to telegraph systems and more particularly to improvements in supervisory equipment for use in telegraph systems.

In telegraph systems, it is important that an alarm be given to avoid the loss of a message or messages during transmission from a transmitter to a reperforator in case that the tape being fed from a tape reel to the reperforator breaks, in case that the transmitter mechanism fails to operate, in case that the reperforator motor and/or tape feed mechanism fail to feed tape to the reperforator, or in case that a fault, i. e. a permanent ground potential, is placed on the signalling circuit between the transmitter and the reperforator.

As is well known in the art, the reperforator tape feed mechanism responds to signals received from a transmitter, and draws tape from the tape reel, thereby to rotate said reel. It can be seen, therefore, that the rotation of the reel is an indication that the transmitter is sending signals, that the reperforator is receiving signals, that the reperforator motor and tape feed mechanisms are operating and that the tape between the tape reel and the reperforator is not broken.

Therefore, a preferred method for giving an alarm in case of the development of one or more of the above said faults is to provide a means (i. e., a supervisory circuit) for continuously checking the movement of the tape reel associated with the reperforator and for giving an alarm if said tape reel does not rotate.

Obviously the movement of the tape reel is to be so checked only after the transmitter is connected to the reperforator, and after some means, manual or automatic, has been operated to start the transmitter to send signals of a message.

As regards a system in which the transmitter is controlled manually, it is sufficient to merely provide the above said supervisory circuit for checking the tape reel movement and some means for rendering said supervisory circuit effective when the transmitter is started.

However, an additional problem arises in automatic telegraph systems, such as that shown and described in the copending application of R. C. Stiles, Serial No. 260,854, filed December 10, 1951, now Patent No. 2,805,-283, issued September 3, 1957. In said system of Stiles, a first reperforator receives and records a message in a continuous tape which is fed automatically to a retransmitter (the terms "transmitter" and "retransmitter" being used interchangeably herein); the retransmitter is connected to a second reperforator; and, while the first reperforator is still receiving and recording the message, the retransmitter begins to send the message to the second reperforator. The second reperforator draws tape from a tape reel associated therewith in response to signals of the message sent thereto by the retransmitter. If the retransmitter operates to send the message faster than it is being received and recorded by the first reperforator, then the tape between the first reperforator and the retransmitter is drawn taut. Incident to said taut tape condition, the retransmitter is automatically stopped.

When the tape between the first reperforator and the retransmitter is again slack, the retransmitter is automatically started again to continue sending the message. Obviously, during the short period of time that the retransmitter is stopped, the second reperforator and its associted tape reel stop. Thus the tape reel stops as a result of a non-fault condition, the transmission of the message merely being momentarily delayed. If the movement of said tape reel is being checked, as described above, it is desirable that some means be provided for rendering the supervisory circuit ineffective during the transmission delay when the tape reel is not moving, so that an alarm will not be given as a result of a non-fault condition.

Another desirable feature is the provision of means for stopping the retransmitter when an alarm is given incident to the supervisory circuit detecting a fault as described above, and also of means controlled manually by an attending operator for causing the retransmitter to be restarted. As will be described later, it is preferable that said manually controlled means be located at or near the reperforator and its tape reel.

Accordingly, it is an object of this invention to provide an improved, greatly simplified and more reliable means for detecting a fault in a transmitting mechanism, a recording mechanism, a signalling circuit interconnecting the transmitting and recording mechanisms, and/or a recording medium, associated with the recording mechanism, during the transmission of a message or messages from the transmitting mechanism to the recording mechanism.

Another object of this invention is to adapt said above-mentioned detecting means to an automatic telegraph switching system in which any one of a plurality of recording mechanisms may be connected to any one of a plurality of transmitting mechanisms.

It is a further object of this invention to provide means controlled by said fault-detecting means for giving an alarm and for stopping the transmitting mechanism when a fault is detected.

It is a further object of this invention to provide means for rendering said fault-detecting means ineffective when a non-fault condition momentarily delays the transmission of a message.

It is a further object of this invention to provide means at the reperforator for causing the transmitter to restart after said fault-detecting means has stopped the transmitter.

A feature of this invention is the greatly simplified, more reliable means for continuously checking the movement of tape being fed to a reperforator and for giving an alarm if the tape fails to move while the reperforator is or should be receiving signals.

Another feature of this invention is the use of a timing relay together with a vibrating reed type of pulsing relay as a timing means in said last-mentioned checking means.

A feature of the invention is the means including a start relay for preventing an alarm when, during the transmission of a message to the reperforator, the tape fails to move for a reason other than a fault.

Another feature is the provision of means for controlling the transmission of a message from a point other than that at which the transmitter is located.

Figure 2:
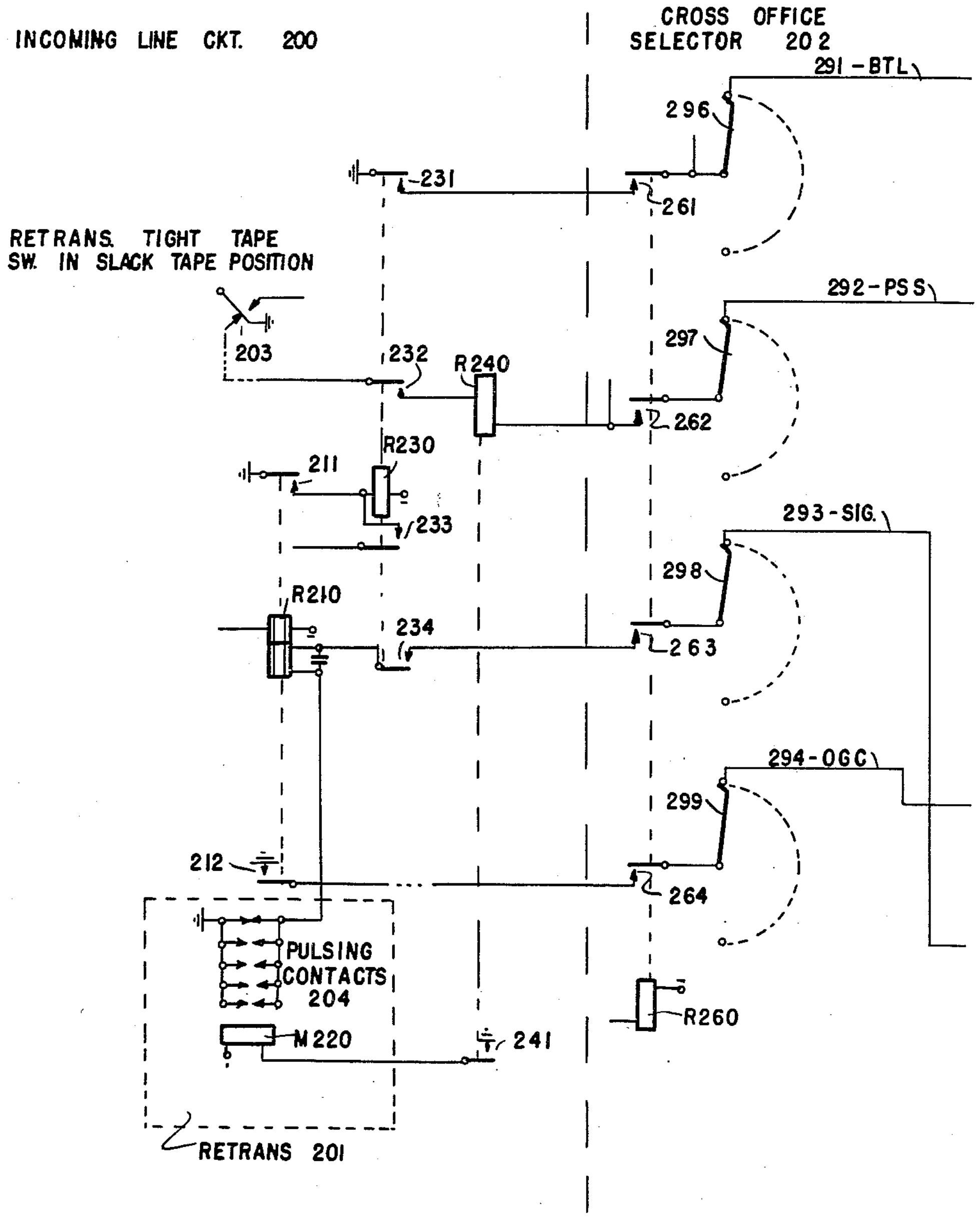
Figure 3:
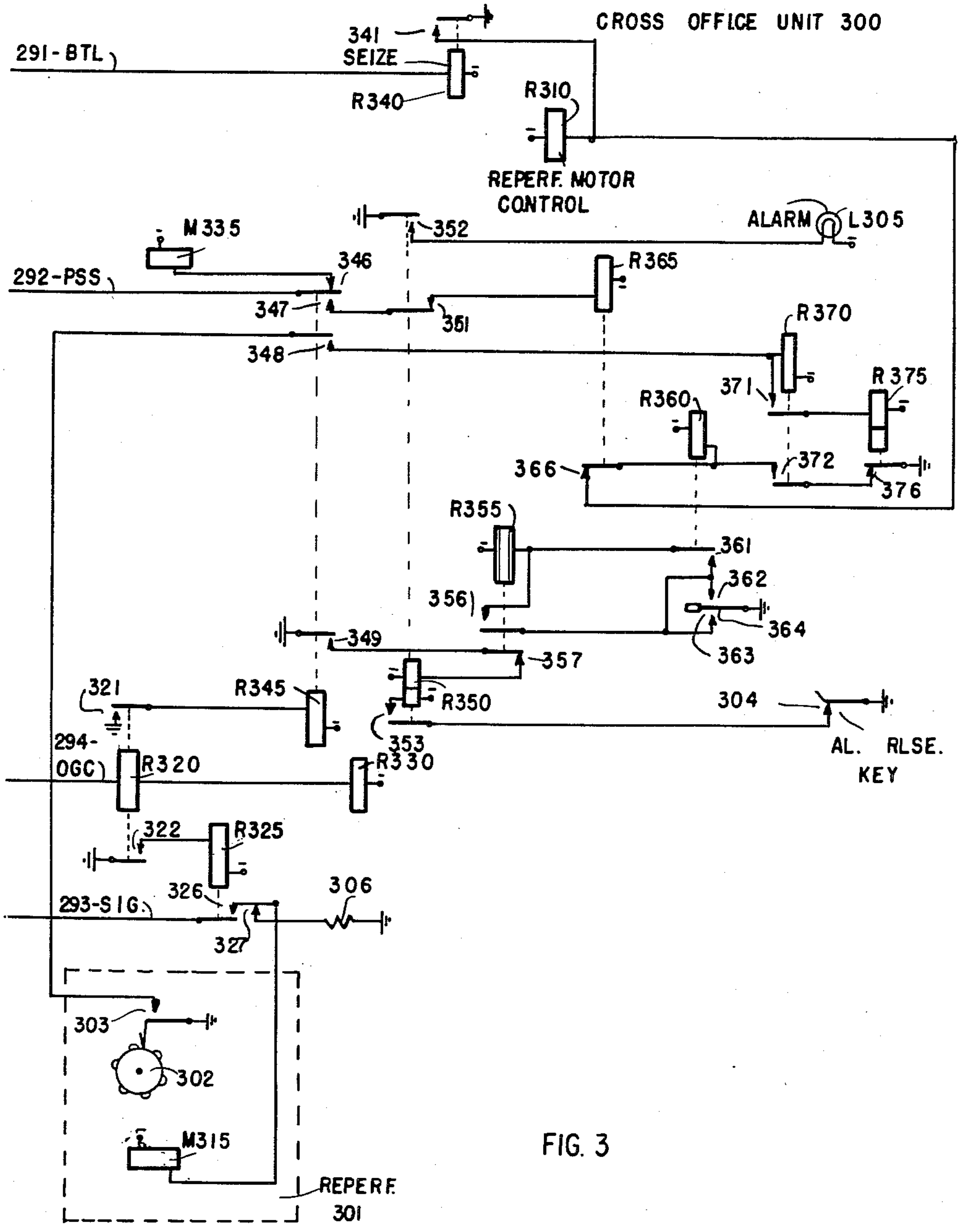

Further objects and features will be evident upon a perusal of the following disclosure in which:

Fig. 1 shows in block diagram part of the system shown and described in detail in the copending application of R. C. Stiles, in which system the proposed invention may be utilized; and, Figs. 2 and 3 show the supervisory circuit together with such pertinent associated equipment of said Stiles application as is felt necessary for a clear explanation of the operation of said supervisory circuit.

It will be noted that, although the herein disclosed invention has been developed for use with reperforators in the cross office units, the multiple call position and the intercept operator position of the automatic telegraph switching system disclosed in the copending application of R. C. Stiles, Serial No. 260,854, filed December 10, 1951, it will be understood that said invention may be utilized with other signal-receiving recording mechanisms.

If a reperforator, permanently connected to a single source of signals, fails to record a received message, the unrecorded message can easily be determined by checking the messages sent from the single source even though considerable time has elapsed before the discovery of the fault.

However, a continuous reperforator tape movement check is felt to be imperative when a reperforator, such as a cross office reperforator 3410 shown in the abovementioned copending application of R. C. Stiles, can be selected for receiving signals from any one of a plurality of sources. The task of comparing all messages received from all of said sources with all messages recorded by all of the available cross office unit reperforators, as well as the reperforators associated with the multiple call position 3340 and the intercept operator position 3330, shown in said copending application of R. C. Stiles, would become difficult and burdensome. Therefore the present invention may be utilized to its best advantage when used with the reperforators associated with the cross office units, the multiple call position and the intercept operator position, shown in said copending application of R. C. Stiles.

In the present application, a supervisory circuit is provided for checking the movement of tape from a tape reel to a reperforator while a retransmitter is or should be sending signals of a telegraph message to said reperforator subsequent to the connection of the retransmitter to the reperforator. Said alarm circuit includes a relay for giving an alarm, a timing relay operated for preventing the operation of the alarm relay, a pulsing relay of the vibrating reed type for maintaing the timing relay operated as long as said pulsing relay is operated, for example every ten seconds or less, and means controlled by the rotation of the tape reel for intermittently operating the pulsing relay, whereby an alarm will be given only if the tape reel stops.

When the alarm relay operates, it causes the retransmitter to stop. When an operator operates a release key in the supervisory circuit, the alarm relay restores and causes the retransmitter to start again. Thus it will be understood that the retransmitter can be controlled to some extent from the supervisory circuit which is associated with the reperforator.

Said supervisory circuit is effective for checking the tape movement only while a start relay, associated therewith, is in an operated condition. Said start relay is initially operated substantially at the time that the retransmitter begins to send the message to the reperforator; and said start relay is restored to render the alarm circuit ineffective whenever the reperforator tape reel stops rotating due to a non-fault condition existing in the incoming line circuit associated with said retransmitter. For example, in the system described in said copending application of R. C. Stiles, it frequently happens that a retransmitter in an incoming line circuit is sending a message to a reperforator in a cross office unit faster than said message is being received and recorded by a reperforator associated with the retransmitter in the incoming line circuit. In such an event, especially if the message is lengthy, the tape upon which the message is being recorded by the latter reperforator is soon drawn taut between the latter reperforator and the retransmitter; and the retransmitter is stopped until the tape becomes slack again. During the time that the retransmitter is stopped, the tape reel in the cross office unit stops as is well known in the art; however, the start relay is restored to render the alarm circuit ineffective, thereby to prevent an alarm.

Only those parts of the system disclosed in said copending application of Stiles, as are felt pertinent to the operation of the proposed invention, are shown herein. It may be well to note which of the elements shown herein correspond to elements of said copending application of Stiles.

In Fig. 1, the switching center 100 corresponds to center UEP in said Stiles application; reel 103, to reel 332; tape 104, to tape 333; reperforator 105, to reperforator 330; tape reader 106, to reader 340; tight tape contacts 203, to contacts 369; retransmitter 201, to retransmitter 360; reel 107, to reel 366; incoming line circuit 200, to circuit 400; director 109, to director 200A; selector 110, to selector 810; selector 202, to selector 3300; cross office unit 300 and its equipment, to unit 3400 and its equipment; and line 119, to line L1.

In Fig. 2, the incoming line circuit 200 (shown in part) corresponds to the incoming line circuit 400 of said copending application of R. C. Stiles; the incoming line retransmitter 201 (shown in part), to the incoming line retransmitter 360; the switch 202 (shown in part), to switch 3300; contacts 203 of the tight tape switch, to contacts 342; the open line relay R210, to R605; the retransmitter magnet M220, to M364; the director release relay R230, to R670; the connect relay R260, to relay R3310; and contacts 261, 262, 263 and 264, respectively to contacts 3313, 3314, 3311 and 3312.

In Fig. 3, the cross office unit 300 (shown in part) corresponds to the cross office unit 3400 of said copending application of Stiles; the reperforator 301 (shown in part), to reperforator 3410; the magnet M315, to magnet M3411; tape reel 302, to tape reel 3412; the motor control relay R310, to R3415; the control relays R320 and R330, respectively to relays R3880 and R3890; the reperforate relay R235, to relay R3800; the precedence magnet M335, to M4217; and the seize relay R340, to relay R3870.

It is further to be noted that one important difference exists between the circuits shown herein and those shown in said copending application of Stiles. In the Stiles system, the retransmitter magnet, corresponding to M220 of Fig. 2 herein, is operated over a circuit including contacts corresponding to the tight tape switch contacts 203 and contacts corresponding to contacts 232 of the director release relay R230 and the winding of said magnet. However, in the circuits shown herein, a magnet control relay R240 will be operated over a circuit including said contacts 203 and 232 and the conductor 292—PSS (which conductor is also used for another function) to complete an obvious circuit for operating the magnet M220 (as will be described subsequently).

*Brief description of the switching center 199*

Particular reference is now directed toward Fig. 1, which shows, in block diagram, part of an automatic telegraph switching center 199, similar to that shown and described in detail in said Stiles application.

Said switching center 199 receives messages from a plurality of distant switching centers, such as center 100, by way of a plurality of incoming lines such as incoming line 101. An incoming line circuit, such as line circuit 200 is individually associated with each of said incoming lines.

Incoming line circuit 200 includes a reperforator 105, a tape reader 106, a retransmitter 201, control circuits 108 and a continuous tape 104 extending from a supply reel 103, through the reperforator 105, tape reader 106 and retransmitter 201 to a storage reel 107.

A director 109 is common to all of said incoming line circuits.

Each incoming line circuit has a cross office selector, for example, selector 202 is individual to the incoming line circuit 200. Each selector has access to a plurality of cross office units, such as unit 300, to a plurality of lines in the multiple call position 112 and to a plurality of lines in an intercept position 111.

Cross office unit 300 includes a reperforator 301, a tape reader 116, an outgoing transmitter 117, control circuits 114, an outgoing selector switch 115 and a continuous tape 113 extending from a supply reel 302, through the reperforator 301, tape reader 116 and transmitter 117 to a storage reel 118. Said cross office unit, by means of selector 115, has access to a plurality of outgoing lines, such as line 120, which lines terminate in distant centers such as 121.

As described in said Stiles application, control information is sent with each message so that said message may be routed automatically to its destination.

In a manner similar to that described in detail in said copending application of Stiles, a message is received from the distant office 100 over the incoming line 101 associated with the incoming line circuit 200. When a message is so received by incoming line circuit 200, the reperforator 105, associated therewith, records the messages on tape 104. The tape is fed to the incoming line tape reader 106.

In accordance with the control information, which accompanies the message, the tape reader 106, the control circuit 108 and the director 109 cooperate to connect the incoming line circuit 200 to a cross office unit, for example, unit 300, by way of the cross office selector switch 202, which switch is individually associated with the incoming line circuit 200, and also to connect the retransmitter 201 to the reperforator 301 by way of said switch 202.

The director 109 then controls the cross office unit control circuits 114 to connect the cross office unit 300 to the outgoing line 120 by way of its associated outgoing selector switch 115, and to further condition the cross office unit 300 for the receipt of the message.

The director 109 subsequently releases, and the retransmitter 201 starts to send the message to the reperforator 301 (the tape 104 being fed from the tape reader 106 to the retransmitter 201 as said tape reader senses the message and its control information). Reperforator 301 records the message on tape 113. It will be noted that the retransmitter 201 may start before the reperforator 105 has received the entire message.

As the reperforator 301 receives the message, the tape reader 116 and the control circuits 114 further condition the cross office unit 300 for the transmission of the message over the outgoing line 120. When line 120 becomes idle (if it is presently busy), the transmitter 117 will be controlled to send the message over line 120.

Those details of the incoming line circuit 200, the cross office selector 202, and the cross office unit 300 as are felt pertinent to the description of the supervisory circuit are shown in Figs. 2 and 3.

*Preparation of the supervisory circuit*

The supervisory circuit, which will check for a fault during the transmission of the message from retransmitter 201 to the reperforator 301, may properly be considered a part of the control circuits 114 of cross office unit 300.

With particular reference to Figs. 2 and 3, it is to be noted that, as described in detail in said Stiles application, the connect relay R260 and the seize relay R340 are operated when cross office unit 300 is selected and seized. The magnet M335 is controlled by the director 109 (Fig. 1) when said director conditions the cross office unit 300 for the receipt of the message. Subsequently, the director causes the open line relay R210 to operate over its upper winding.

At contacts 341, the seize relay R340 (Fig. 3) completes an obvious circuit for operating the cross office reperforator motor control relay R310 and also for operating the pulsing relay R360. The motor control relay R310 starts the motor of the cross office reperforator 301. The pulsing relay R360 closes contacts 361 and 362 to operate the timing relay R355. When R355 operates, it closes contacts 356 to complete an obvious holding circuit for itself; and, at contacts 357, opens a point in the operating circuit of the alarm relay R350.

At contacts 211, the open line relay R210 (Fig. 2) completes an obvious circuit for operating the director release relay R230; and, at contacts 212, completes a circuit for operating the control relays R320 and R330, said circuit including contacts 212 and 264, wiper 299, conductor 294—OGC and the windings of R320 and R330.

When relay R230 (Fig. 3) is operated by R210, it completes at contacts 321 an obvious circuit for operating the transfer relay R345; and, at contacts 322, completes an obvious circuit for operating the reperforate relay R325. When the director release relay R230 (Fig. 2) is operated by R210, it completes at contacts 231 a circuit for maintaining the seize relay R340 operated during the transmission of the message to the cross office unit 300, said circuit extending from ground over contacts 231 and 261, wiper 296 of switch 202, conductor 291—BTL through the winding of R340 to battery; at contacts 232, operates the transmitter control relay R240 over a circuit (not fully shown) including ground on contacts 203 of the tight tape switch (in its slack tape position), contacts 232, the winding of R240, contacts 262, wiper 297 of switch 202, conductor 292–PSS, contacts 346 (if the transfer relay R345 has not as yet operated), and battery on the winding of magnet M335, M335 not operating in this circuit because R140 is a high resistance relay; at contacts 233, locks itself operated over a circuit (not fully shown); at contacts 234 prepares a circuit for the transmission of signals from the retransmitter 201 to the cross office reperforater 301; and R230 (by means not shown) further initiates the release of the director in a manner described in said copending application of Stiles.

When the transfer relay R345 is operated by R320, it completes at contacts 347 an alternate circuit for maintaining the transmitter control relay R240 operated and for operating the supervisory circuit start relay R365 in series with R240, said alternate circuit including contacts 203 and 232, the winding of R240, contacts 262, wiper 297, conductor 292—PSS, contacts 347 and 351, and the winding of R365. When the reperforate relay R325 is operated by R320, it closes contacts 326 to complete the signalling circuit between the retransmitter 201 and the reperforator 301, said circuit extending from the pusing contacts 204 of retransmitter 201, over the lower winding of R210, contacts 234 and 263, wiper 298, conductor 293—SIG, contacts 326 and the winding of magnet M315 of the reperforator 301 to battery.

When the transmitter control relay R240 is operated by R230, it completes at contacts 241 an obvious circuit for operating the magnet M220 of the retransmitter 201. Said magnet M220 is now ready to control the pulsing contacts 204 in a manner well known in the art to send signals of the message (received by the incoming line circuit 200) to the reperforate magnet M315. The magnet M315 is now ready to control equipment (not shown) in the reperforator 301 to record the message on the tape 113 (Fig. 1). Said magnet M315 further controls means (not shown) in the reperforator 301 for drawing said tape from the tape reel 302, thereby to cause tape reel 302 to rotate.

*Operation of the supervisory circuit*

The supervisory circuit is now ready for checking the movement of tape 113 (Fig. 1) from tape reel 302 to the cross office reperforator 301.

When the start relay R365 (Fig. 3) is operated by R345, as previously described, it opens the above-mentioned operating circuit of the pulsing relay R360 at contacts 366, thereby to restore R360. R360 is of the vibrating reed type of relay well known in the art. When R360 restores, the vibrating reed 364 begins to vibrate and will continue to vibrate sufficiently for a period of about ten seconds to alternately close contacts 362 and 363 to maintain the slow to release timing relay R355 operated. It will be understood, therefore, that as long as R360 is operated every ten seconds or less, the timing relay R355 will be maintained operated.

As the tape reel 302 rotates, as previously described in coordination with the operations of the reperforate magnet M315, it intermittently closes contacts 303, associated therewith, to operate relay R370 over a circuit extending from ground over contacts 303 and 348 through the winding of R370 to battery. At contacts 372, relay R370 completes an obvious circuit for reoperating the pulsing relay R360; and, at contacts 371, completes a branch of its operating circuit for operating the slow to operate interrupter relay R375. At contacts 376, R375 opens the last-mentioned operating circuit for R360, R360 restoring. It will be noted that the projections on the tape reel 302 for operating contacts 303 must be arranged such that contacts 303 will be operated every ten seconds or less when the tape reel 302 is rotating at its slowest speed, that is, when the amount of tape on said reel is greatest. In view of the foregoing, it will be understood that the supervisory circuit is effective to check the rotation of tape reel 302 only while the start relay R365 in an operated position, in which position it opens at contacts 366 the first-mentioned operating circuit for the pulsing relay R360.

If during the transmission of the message to the cross office reperforator 301, the tape reel 302 should cease to rotate, for example, if the tape 113 (Fig. 1) should break, if the signalling circuit opens, if the retransmitter 201 fails to operate, or if the reperforator tape feed mechanism or motor should fail to operate, then contacts 303 will not be closed to operate relays R370 and 375. As a result thereof, R360 will not reoperate; and, at the end of ten seconds after the last operation of R360, the timing relay R355 will restore. When R355 restores, it closes contacts 357 to complete a circuit for operating the alarm relay R350, said circuit extending from ground on contacts 349 of the operated relay R345, over contacts 357 of the restored timing relay R355 and through the upper winding of R350 to battery.

At contacts 351, the alarm relay R350 restores R365 and the transmitter control relay R240, the latter restoring the magnet M220 to stop the transmission of the message; at contacts 352, lights the alarm lamp L305; and, at contacts 353, locks itself operated over an obvious circuit including contacts 304 of the alarm release key.

When R365 restores, it closes contacts 366 to reoperate the pulsing relay R360 over its first-mentioned operating circuit. R360 reoperates the timing relay R355.

The slow to operate interrupter relay R375 has been provided for the purpose of providing for the operation of the alarm relay R350 in the event that the tape reel 302 stops in a position such that one of its projections maintains contacts 303 closed, thereby to maintain relay R370 operated. In such an event, R375 opens contacts 376 to restore the pulsing relay R360 even though the relay R370 is operated. Then, after a short time delay (of about ten seconds) the timing relay R355 will restore to operate the alarm relay R350.

*Restoration when no fault is encountered*

Assume that the entire message has been transmitted to and recorded in the cross office unit 300.

In a manner described in detail in said copending application of Stiles, the incoming line circuit 200 will be controlled to restore to normal, relays R210, R230 and R240 and magnet M220 restoring; and, at the same time, the cross office selector switch 202 and its connect relay R260 will be controlled to restore to normal. Relays R320, R330, R340 and R365 restore when switch 202 restores to normal; relays R325 and R345 restore upon the restoration of R320; R325 recloses contacts 327 to maintain magnet M315 operated over an obvious circuit including the resistance element 306, thereby to prevent further rotation of tape reel 302; the restoration of R345 prevents further operation of relays R370 and R375 even though the tape reel 302 may have stopped in a position such that contacts 303 are closed; and the restoration of R340 restores the motor control relay R310 and also opens the first-mentioned operating circuit of the pulsing relay R360. Timing relay R355 restores, but only after R345 restores so that the alarm relay R350 will not operate.

*Procedure when an alarm is given*

One method of procedure which an operator can follow subsequent to an alarm will be described. It is to be understood that this procedure is given by way of example only.

The operator will momentarily depress a release key associated with cross office unit 300 to momentarily open contacts 304 (Fig. 3), thereby to restore the alarm relay R350. R350 will open the circuit for lamp L305 and will reoperate relays R365 and R240 (Fig. 2). The retransmitter magnet M220 will reoperate, and transmission of the message will be resumed although said message will not be recorded in cross office unit 300 due to the still existing fault. The operator must manually rotate the tape reel 302 periodically to prevent the reoperation of the alarm relay R350; or he could merely reoperate the release key every time the alarm relay operates, this being a less desirable method. When the entire message has been processed by the retransmitter 201, the equipment shown herein will be restored to normal in a manner similar to that previously described. The operator will (by means not shown) mark the cross office unit 300 busy to prevent its seizure for transmission of other messages thereto until the fault has been corrected.

Then, the operator will remove that part of the tape 104 (Fig. 1) upon which the message is recorded and see to it that the message is in some manner transmitted over the outgoing line 120.

In view of the foregoing, it will be understood that the retransmitter 201 can be controlled from a supervisory circuit associated with the reperforator 301.

*Preventing an alarm when a non-fault condition stops the tape reel*

It may happen that, as the signals of a message are being received at one rate of speed by the reperforator 105 (Fig. 1) associated with the incoming line circuit 200, the retransmitter 201 will be simultaneously retransmitting the signals of the message to cross office unit 300 at a faster rate of speed. In such an event, especially if the message is long, the tape 104 will be drawn taut between the reperforator 105 and the tape reader 106 and between tape reader 106 and the retransmitter 201. The taut tape will raise the tight tape switch to its tight tape position, thereby to open contacts 203, which contacts are shown in Fig. 2 as well as in Fig. 1. The retransmitter control relay R240 (Fig. 2) and the start relay R365 (Fig. 3) restore.

R240 restores the retransmitter magnet M220, thereby to stop the transmission of signals; as a result thereof, the reperforate magnet M315 remains energized to stop the tape reel 302.

However, R365 restores contacts 366 to again complete the first-mentioned circuit for operating the pulsing relay R360. As long as R360 is thus maintained operated, the timing relay R355 will be maintained operated and no alarm will be given.

When a sufficient length of slack tape has been accumulated between the retransmitter 101 (Fig. 1) and the tape reader 106, the tight tape switch will return to the slack tape position to close contacts 203, thereby to reoperate relays R240 and R365 and magnet M220. The retransmitter 201 will resume the transmission of the message and the supervisory circuit will again check the tape movement in the cross office reperforator 301.

While there has been described what is at present considered to be the preferred embodiment of the invention, it will be understood that various modifications may be made therein; and it is contemplated to cover in the appended claims all such modifications as fall within the true spirit and scope of the invention.

What is claimed is:

1. In a telegraph system, a transmitting mechanism, a recording mechanism, means for connecting the transmitting mechanism to the recording mechanism, a reel for supplying a recording medium to the recording mechanism, means controlled incident to said connection for initiating the operation of the transmitting mechanism to cause it to send signals of a telegraph message to the recording mechanism, said recording mechanism operated by said signals for recording the message on the recording medium and for causing the reel to rotate in coordination with the operation of the recording mechanism and a supervisory control circuit associated with the recording mechanism and comprising an alarm relay, means operated independent of the recording mechanism for rendering the supervisory circuit effective during transmission of the message, a pulsing relay, means controlled by the reel for intermittently operating the pulsing relay while the reel is rotating, means controlled by the pulsing relay for preventing the operation of the alarm relay after said pulsing relay has restored as long as the reel is rotating, circuit means for operating the alarm relay incident to the reel failing to rotate, means located near the recording mechanism and controlled by an operator for restoring the alarm relay, and means controlled by the alarm relay when it is operated for causing said initiating means to stop the transmitting mechanism and when it is restored for causing said initiating means to start the transmitting mechanism.

2. In a telegraph system, a transmitting mechanism, a recording mechanism, means for connecting the transmitting mechanism to the recording mechanism, a reel for supplying a recording medium to the recording mechanism, means controlled incident to said connection for initiating the operation of the transmitting mechanism to cause it to send signals of a telegraph message to the recording mechanism, said recording mechanism operated by said signals for recording the message on the recording medium and for causing the reel to rotate in coordination with the operation of the recording mechanism and, in combination therewith, a supervisory control circuit associated with the recording mechanism and comprising an alarm relay, a timing relay for preventing the operation of the alarm relay, a pulsing relay, means controlled by the reel for intermittently operating the pulsing relay while the reel is rotating, means associated with the pulsing relay for operating the timing relay and for maintaining the timing relay operated after said pulsing relay has restored as long as the reel is rotating, circuit means for operating the alarm relay incident to a restoration of the timing relay in case that the reel does not rotate, means located near the recording mechanism and controlled by an operator for restoring the alarm relay, and means controlled by the alarm relay when it is operated for causing said initiating means to stop the transmitting mechanism and when it is restored for causing said initiating means to start the transmitting mechanism.

3. In a telegraph system, a transmitting mechanism, a recording mechanism, means for connecting the transmitting mechanism to the recording mechanism, a reel for supplying a recording medium to the recording mechanism, means controlled incident to said connection for initiating the operation of the transmitting mechanism to cause it to send signals of a telegraph message to the recording mechanism, said recording mechanism operated by said signals for recording the message on the recording medium and for causing the reel to rotate in coordination with the operation of the recording mechanism and, in combination therewith, a supervisory control circuit comprising a pulsing relay having an operating circuit, means controlled to operate the pulsing relay over said circuit incident to the connection of the transmitting mechanism to the recording mechanism, a start relay thereafter operated to open said operating circuit, means controlled by the reel for intermittently operating the pulsing relay as long as the reel is rotating, a timing relay operated responsive to the initial operation of the pulsing relay, circuit means controlled by the intermittent operations of the pulsing relay for maintaining the timing relay operated as long as the reel is rotating, an alarm relay operated after said pulsing relay has restored responsive to the restoration of the timing relay in case that the tape reel stops, said initiating means controlled by the operation of the alarm relay to cause the transmitting mechanism to stop, means also controlled by the operation of the alarm relay for giving an alarm, means operated for controlling said initiating means to cause the transmitting mechanism to stop and for restoring the start relay when a particular non-fault condition originates at the transmitting mechanism, the recording mechanism and reel stopping when the transmitting mechanism stops and the initial operating circuit completed upon the restoration of the start relay to maintain the pulsing relay operated, the timing relay being maintained operated by the pulsing relay, whereby no alarm will be given when said non-fault condition originates.

4. For use in a telegraph system having a transmitter, a reperforator and a transmission circuit together with means for connecting the reperforator to the transmitter by way of the transmission circuit and for controlling the transmitter to send signals of a telegraph message to the reperforator to cause said reperforator to record the message on a tape fed thereto from a tape reel, means associated with said reel for originating pulses at predetermined intervals as long as tape-reel is rotating, an alarm system comprising a timing circuit receiving said pulses, said timing circuit comprising a pulsing relay intermittently operated by said pulses, an alarm relay, contacts associated with said pulsing relay intermittently operating and thereby maintaining said alarm relay inoperative during said time intervals after said pulsing relay has restored, said contacts thereafter releasing and causing an operation of said alarm relay to thereby cause said transmitter to stop sending.

5. For use in a telegraph system having a transmitter, a reperforator and a transmission circuit together with means for connecting the reperforator to the transmitter by way of the transmission circuit and for controlling the transmitter to send signals of a telegraph message to the reperforator to cause said reperforator to record the message on a tape fed thereto from a tape reel, means associated with said reel for initiating pulses at predetermined intervals when said tape-reel is rotating, an alarm system comprising an alarm relay and a timing circuit receiving said pulses, said timing circuit comprising a pulsing relay intermittently operated by said pulses, vibrating reed timing contacts associated with said pulsing relay, said contacts continuing to vibrate after said pulsing relay has restored to thereby maintain said alarm relay inoperative, said contacts thereafter releasing and allowing said alarm relay to operate, means controlled by the operation of said alarm relay to cause said transmitter to stop sending.

6. In a telegraph system, a transmitting mechanism, a recording mechanism, means for connecting the transmitting mechanism to the recording mechanism, a reel for supplying a recording medium to the recording mechanism, means controlled incident to said connection for initiating the operation of the transmitting mechanism to cause sending of signals of a telegraph message to the recording mechanism, said recording mechanism operated by said signals for recording the message on the recording medium and for causing the reel to rotate in coordination with the operation of the recording mechanism and, in combination therewith, a supervisory control circuit comprising a pulsing relay having an operating circuit, means controlled to operate the pulsing relay over said circuit incident to the connection of the transmitting mechanism to the recording mechanism, a start relay thereafter operated to open said operating circuit, means controlled by the reel for intermittently operating the pulsing relay as long as the reel is rotating, a timing relay operated responsive to the initial operation of the pulsing relay, relay contact means associated with said pulsing relay for maintaining the timing relay operated after said pulsing relay has released as long as the reel is rotating, an alarm relay operated responsive to the restoration of the timing relay when the tape reel stops, said second-mentioned means controlled by the operation of the alarm relay to cause the transmitting mechanism to stop, means also controlled by the operation of the alarm relay for giving an alarm.

7. For use in a telegraph system having a transmitter, a reperforator and a transmission circuit together with means for connecting the reperforator to the transmitter by way of the transmission circuit and for controlling the transmitter to send signals of a telegraph message to the reperforator to cause said reperforator to record the message on a tape fed thereto from a tape reel, means associated with said reel for originating pulses at predeterminted intervals as long as said reel is rotating, an alarm system comprising a timing circuit receiving said pulses and an alarm relay, said timing circuit comprising a pulsing relay intermittently operated by said pulses, a vibrating reed relay initially operated by said pulsing relay, said reed relay thereafter vibrating and maintaining said alarm relay inoperative, said pulsing relay continuing to pulse as long as said reel is rotating, said vibrating reed relay continuing to vibrate and maintain said alarm relay inoperative, said means associated with the tape reel stopping the sending of pulses incident to said reel ceasing rotation, said pulsing relay thereafter restoring, said vibrating reed relay continuing vibration thereafter, said reed relay thereafter releasing and causing said alarm relay to operate, means associated with said transmitter incident to the operation of said alarm relay for causing said transmitter thereafter to stop sending.

References Cited in the file of this patent

UNITED STATES PATENTS

| | | |
|---|---|---|
| 2,142,880 | Anderson et al. | Jan. 3, 1939 |
| 2,293,704 | Blanton | Aug. 25, 1942 |
| 2,300,050 | Leonard et al. | Oct. 27, 1942 |
| 2,376,111 | Bacon | May 14, 1945 |